United States Patent Office 2,924,040
Patented Feb. 9, 1960

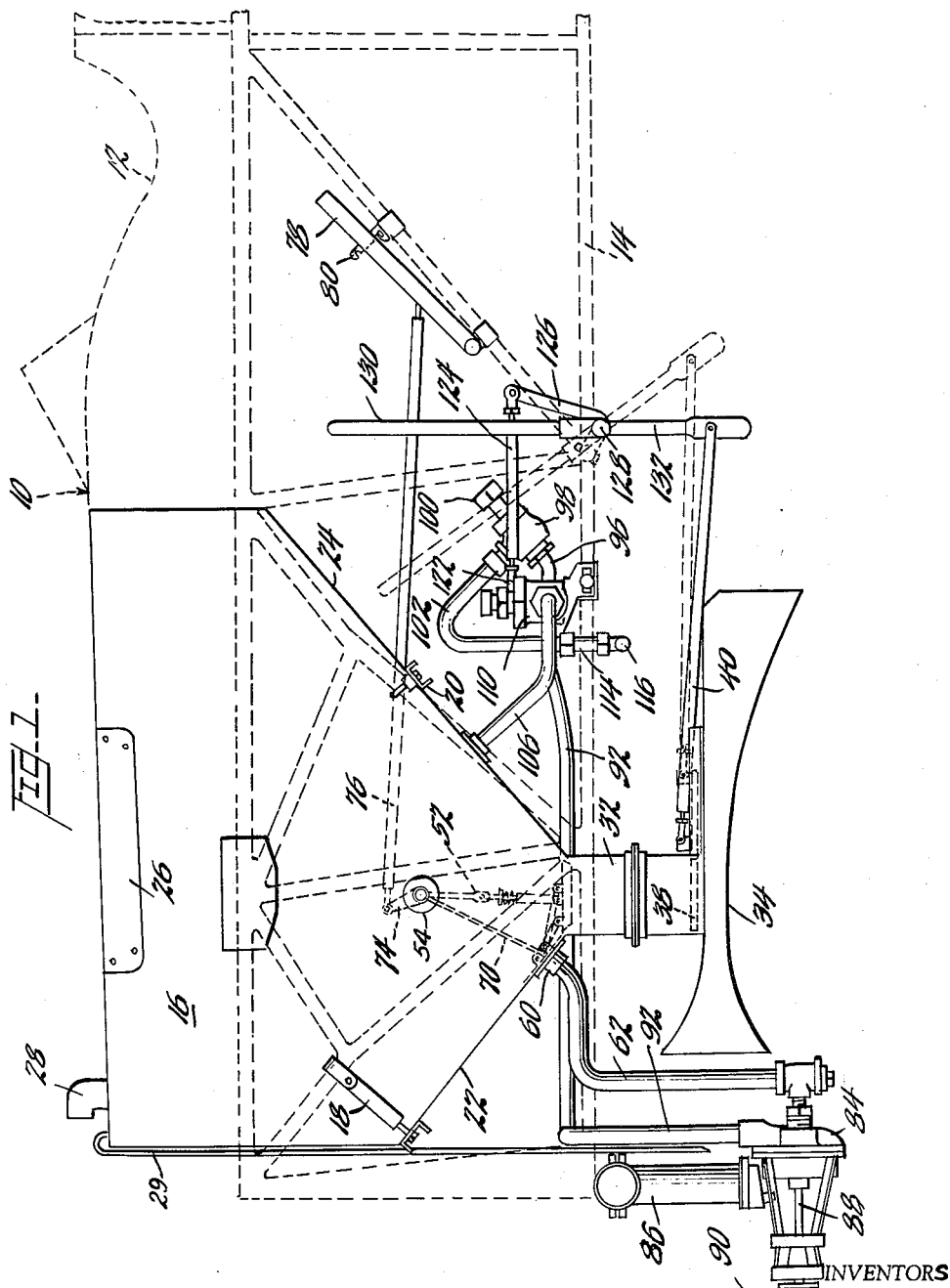

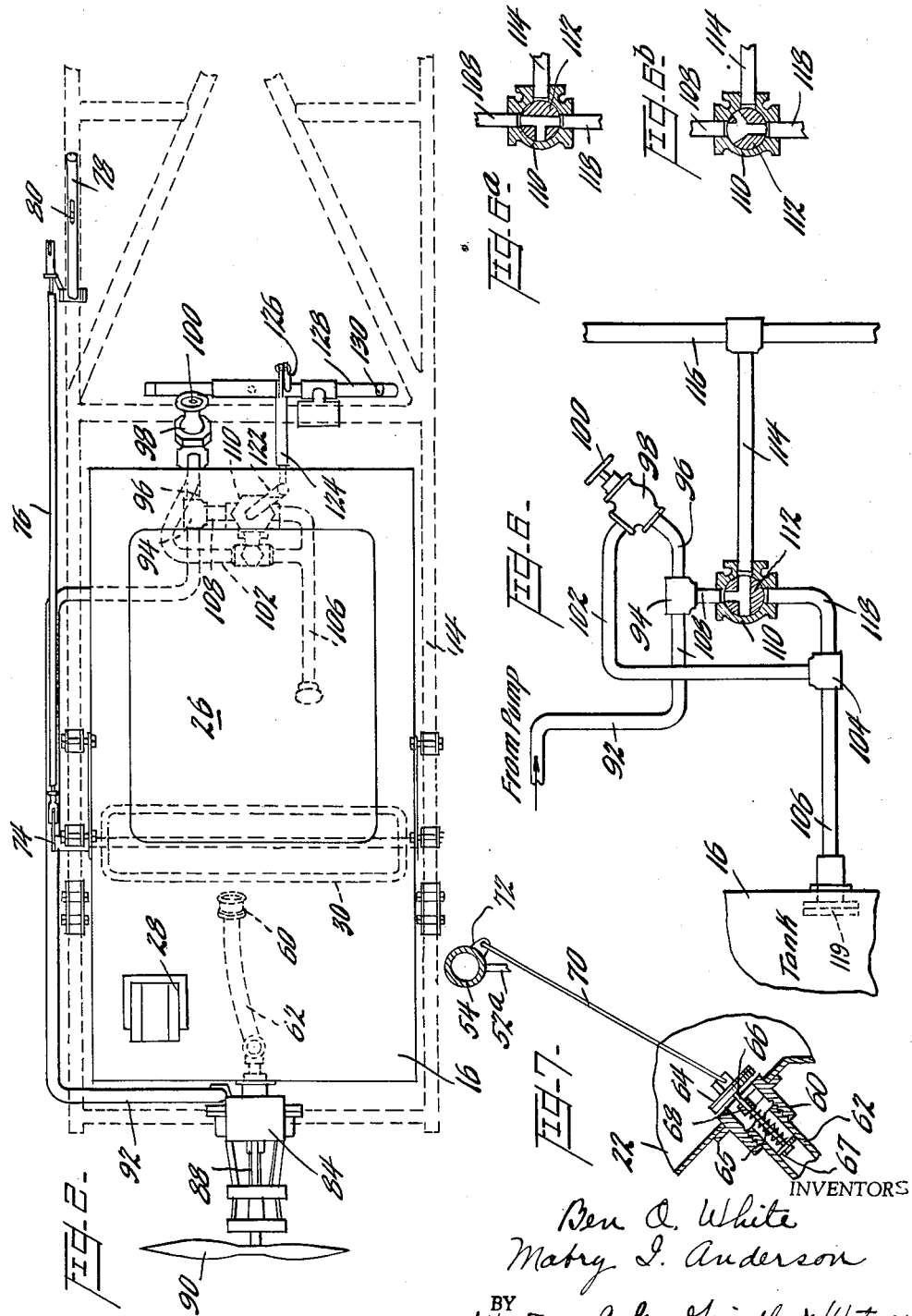

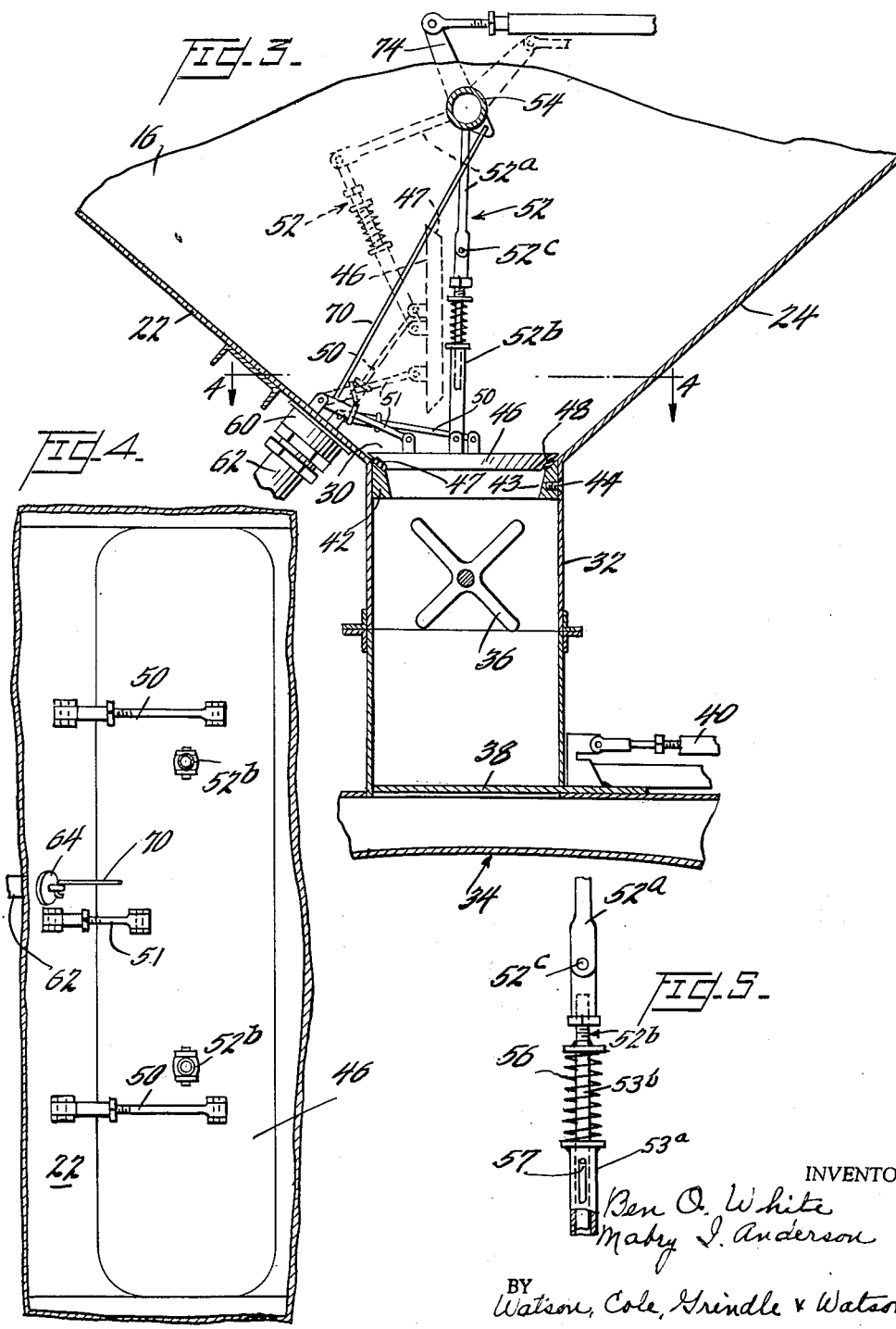

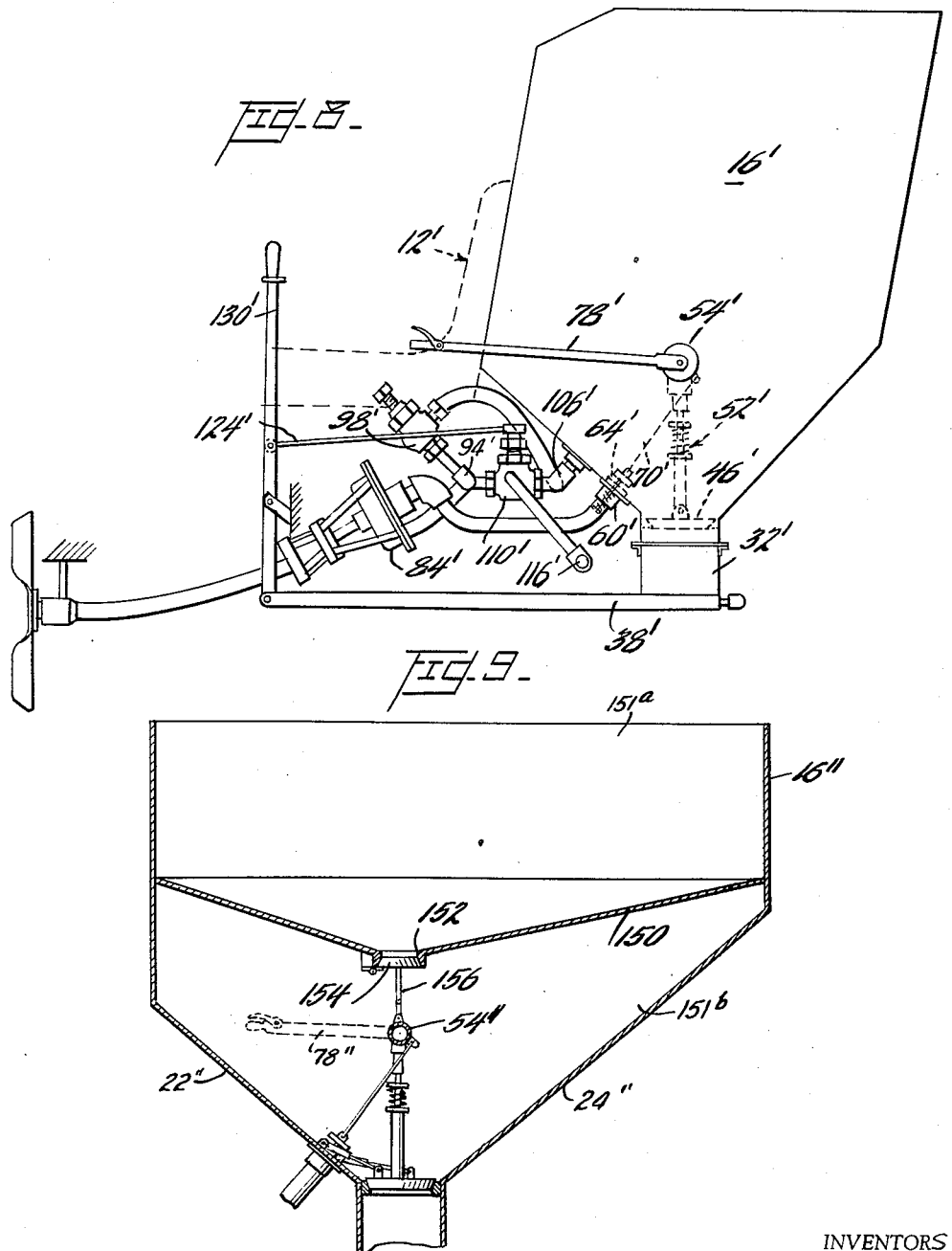

2,924,040

COMBINED SPRAYING AND DUSTING APPARATUS FOR AIRCRAFT

Ben O. White and Mabry I. Anderson, Clarksdale, Miss.

Application June 5, 1956, Serial No. 589,415

16 Claims. (Cl. 43—147)

This invention relates to the art of dusting and spraying of agricultural crops and the like by aerial methods and is more particularly directed to an apparatus adapted for the aerial dispensing of both solid and liquid materials.

In many areas it has become standard practice to apply insecticides, poisons, fertilizer and the like to various agricultural crops from aircraft flying at relatively low heights above the ground. Some of the materials to be dispensed in this fashion are in liquid form while others are in powdered or granular form, dependent upon the particular purpose to be accomplished and the particular active ingredient to be applied. For obvious reasons, apparatus designed for handling liquids is not well suited for handling granulated solids, and vice versa; accordingly, it has been usually necessary for separate aircraft to be employed, one equipped with apparatus adapted for liquids and the other with apparatus adapted for finely divided solids.

Efforts have been made to eliminate the need for entirely separate aircraft by providing an apparatus having separate but interchangeable liquid and solid spreading devices capable of attachment to a single supply hopper. While this arrangement does offer some improvement, it nevertheless requires that the aircraft be out of service for the length of time necessary for the change-over and is generally inconvenient for the operator.

The object of the present invention is therefore to provide a self-contained aerial dispensing apparatus which is adapted for both finely divided solid and liquid materials and is subject to conversion from one to the other wtihout the addition or removal of any component parts.

Another object of the invention is the provision of a combination liquid and solid aerial dispensing apparatus which, if desired, can be converted from one to the other merely by the manipulation of control mechanisms permanently attached to the aircraft.

An additional object is the provision of a combined liquid and solid material dispensing apparatus for aircraft comprising a receptacle for liquid and/or finely divided solid material, separate means operable to discharge the materials from said receptacle independently of the other in a given order dependent upon the order in which they were loaded, and a single control device for alternatively operating said separate means.

A further object is the provision of a dispensing apparatus for aircraft whereby liquid and granular material may be alternatively dispensed comprising a hopper for receiving the material to be dispensed, a discharge port for granular material in said hopper, a discharge port for liquid material in said hopper, valve means for said granular material port, valve means for said liquid material port, a common control means for both of said valve means whereby when one of said means is closed the other is open and vice versa, liquid distributing means, conduit means connecting said liquid material port to said liquid distributing means, said conduit means including a control valve, granular material distributing means, conduit means connecting said granular material distributing means to said granular material discharge port, said conduit means including a control valve, and means connected to said control valves to operate the same.

These and other objects and advantages will be readily apparent from the following description when read in conjunction with the annexed drawings in which:

Figure 1 is a view in side elevation of one form of the apparatus of the present invention with a portion of the aircraft with which the apparatus is associated being shown in dotted lines to indicate the general relationship of the apparatus to the aircraft;

Figure 2 is a plan view looking down on the apparatus of Figure 1;

Figure 3 is an enlarged detail view in cross-section of the lower end of the material-containing receptacle or hopper, showing the details of the discharge outlets of the receptacle, the valves for these outlets and the control mechanism for opening and closing the valves;

Figure 4 is a view taken substantially along line 4—4 of Figure 3;

Figure 5 is an enlarged detail view of the operating link for the granular-material valve or closure plate;

Figure 6 is a schematic view of the conduit system for liquid materials, with a three-way valve included in the system being shown in cross-section at one of its positions;

Figure 6a is a view of the three-way valve of Figure 6 in the other of its positions;

Figure 6b is a view of a modified form of three-way valve;

Figure 7 is an enlarged detail cross-sectional view showing the fluid outlet port, the valve for this port, and the operating rod for the valve;

Figure 8 is a view in side elevation of an alternative arrangement of the apparatus of the present invention in which the relationship of the apparatus to the operator is generally reversed; and Figure 9 is a longitudinal cross-section of a modified form of material-containing receptacle and the discharge mechanism associated therewith, which is adapted for successively discharging liquid and finely divided solid materials while the aircraft is in flight.

In general terms, it will be understood that the apparatus of the present invention, which is adapted to be mounted on and carried by an aircraft, comprises a receptacle or hopper for containing a supply of the material, either in liquid or granular solid form, which is to be dispensed, separate spreading means for liquid and for granular solid material, and a conduit or system of conduits for connecting the receptacles to the respective spreading means. Each of the conduits includes closure means at its point of connection with the receptacle and a single control mechanism is utilized for alternatively operating the valves, so that when one is open the other is closed and vice versa. Each of the conduits also normally includes a discharge regulating valve, and a single control mechanism, distinct from the first-mentioned control mechanism, is selectively connected to either or both of the discharge regulating valves to operate them. If desired, the hopper may be so designed as to simultaneously contain both liquid and granular solid materials, but in separate compartments and, in this case, a further valve is provided in the common wall between the compartments, which valve is also adapted to be operated by the first-mentioned control mechanism. Dependent upon the particular type of aircraft with which the apparatus is to be associated, the hopper may be disposed either in front of or behind the aircraft operator.

Turning now to a detailed description of the apparatus of the present invention, in Figures 1 and 2 the numeral 10 designates the fuselage of the aircraft which includes the usual cockpit 12 for the operator and a framework of braces, struts and the like, generally indicated at 14, all of which are shown in dotted lines. There is disposed within fuselage 10 at a location, which in accordance with the arrangement of Figures 1 and 2 is forward of cockpit 12, a storage receptacle or hopper 16 supported from selected members of the framework at appropriate points, as by means of clamps or brackets 18 and 20, these brackets being duplicated on each side of the hopper and framework. The size and shape of hopper 16 are largely governed by the space available in the aircraft intermediate the cockpit and the power plant but the lower portion of the front and rear walls thereof are preferably inclined inwardly, as at 22 and 24. At the top of the hopper 16 is provided a removable hatch 26 by means of which the hopper may be rapidly filled with the material to be dispensed, as well as an air-vent 28 which enables the material being discharged to flow smoothly and readily from the hopper. To prevent liquid material from flowing out of air-vent 28 and onto the windshield of the cockpit should the hopper be over-filled and the liquid expand under summer temperatures, for example, an overflow vent 29 is utilized, communicating with the hopper at the top and opening beneath the airplane to discharge any overflow into the slip-stream. As can be best seen in Figure 3, the lower terminal edges of inclined walls 22 and 24, which with the side wall of the hopper define an elongated rectangular opening 30 extending substantially entirely across the width of hopper 16, are joined to the upper end of the chute-like conduit 32. This conduit projects beyond the bottom surface of fuselage 10 and at its lower end empties into a "Venturi" spreading device 34, having an air intake opening at its forward end, a discharge outlet at its rear end and a section of restricted cross-section intermediate these ends. Spreading devices of this general type are ordinarily employed in the art of dispensing granular solids so that a further description of the structure and action of the device is deemed unnecessary for the purposes of the present description. Located within conduit 32 is a rotatable reel 36 which serves to maintain the granular material passing therethrough in a state of agitation to break up possible aggregates of the material to effect more efficient distribution and to prevent the conduit from becoming clogged. Reel 36 may be driven by means well known in the art, such as a take-off from the power plant of the aircraft or by an independent wind-driven fan. The rate of discharge of the material from the chute may be regulated by means of a sliding plate-like gate or valve 38 at the lower end of conduit 32 which gate is adapted to be positioned by means of a connecting rod 40.

Still referring to Figure 3, at the junction of chute 32 with walls 22 and 24, there is mounted an annular insert or throat 42 which is held in place by means of threaded fastening devices 44. The inner peripheral face 43 of insert 42 is tapered inwardly and downwardly to provide a seat for a closure plate or valve member 46 having a beveled edge 47 to generally mate with the tapered surface of the insert. An effective liquid-proof seal between closure plate 46 and insert 42 may be, and preferably is, obtained by providing around the beveled periphery of plate 46, a sealing ring or gasket 48 constituted of resilient material capable of withstanding possible chemical attack or deterioration by any of the materials which might be introduced into the hopper.

Closure plate 46 is so mounted within hopper 16 that it is adapted to pivot from a horizontal position sealing off opening 30 to a generally vertical position disposed entirely above the plane of opening 30. To this end, a combination of one or more long links 50 and short links 51 are pivotably connected at one end thereof to the upper surface of plate 46, the axis of connection of the long link or links being spaced from the axis of connection of the short link or links in the direction of the plate width, i.e., the dimension of the plate extending parallel to the longitudinal axis of the aircraft, and at the other end to one of the inclined walls 22, 24 at points spaced along the corresponding dimension thereof. The short link is pivoted to the plate nearer the plate edge and to the wall farther away from the wall edge adjacent the plate while the long link is pivoted farther away from the plate edge and nearer the wall edge. Various combinations of links may be used as is needed to provide stability and support for the plate. For example, two long links and a central short link are shown, although pairs of links may be used, if necessary. For convenience, this linkage arrangement will be referred to hereinafter and in the claims as crossed links. Links 50 may be constructed of two members threaded together whereby their effective length may be adjusted in order that the plate may precisely seat against insert 42.

For the purpose of operating the closure plate, that is, of moving the plate to and from open and closed positions, an articulated or toggle link 52, having two sections 52a and 52b which are hinged together at 52c, is pivotably connected at its lower end to plates 46 and at its upper end is fixed to a shaft 54 extending transversely of the hopper somewhat above opening 30 in generally vertical alignment with the axis of the opening. As is shown in Figure 5, the lower section 25b of articulated link 52 is formed of two telescoping portions 53a and 53b which are spring-urged to fully extended position by means of spring 56 but are prevented from separating entirely by a pin and slot connection 57. Shaft 54 is adapted to rotate about its longitudinal axis, being journaled in the side walls of hopper 16 with the joint rendered leak-proof by means of conventional packing gland or the like, and the upper end of link-section 52a is secured to the shaft on a fixed radius so as to rotate therewith.

The extreme size of opening 30 at the lower end of hopper 16 causes it to be unsuited for the controlled discharge of materials in liquid form and in order to permit the handling of fluids by the apparatus the hopper is provided adjacent opening 30 with an orifice fitting 60 which is coupled to one end of a conduit or pipe 62. To close off the orifice and prevent the discharge of liquid therethrough, a valve 64 (Figure 7) is utilized which is adapted to seat in the orifice. Valve 64 is spring-loaded to closed position by coil spring 65 encircling the valve stem 66, bearing at one end against a stop 67 fixed to the valve stem and at the other against a narrow crossbar 68 carried by the fitting 60. The valve is adapted to be opened by means of a connecting rod or wire 70 pivoted at one end to the valve and at the other to a radially projecting ear 72 on shaft 54. The pivotal axis of the upper end of rod 70 relative to shaft 54 lies on a different radius from that coinciding with section 52a of articulated link 52, and the angle separating the two radii is so selected that when shaft 54 is in a position at which the closure plate is sealed, valve 64 has been lifted from its seat by rod 70 and, conversely, when shaft 54 is in a position where plate 46 is displaced from its closed position, valve 64 is seated by spring 66 against the orifice to close the same. Ordinarily, this angle will approximately correspond to the arc through which shaft 54 must be rotated in order to move closure plate 46 to and from open and closed position. An end of shaft 54 projecting exteriorly of hopper 16 carries a crank arm 74 attached to the shaft for rotation therewith and to this crank arm is pivotally connected an elongated control rod 76. Rod 76 extends from shaft 54 to the cockpit 12 of the aircraft and is pivotally connected there to a rockable control handle 78 situated within easy reach of the operator of the aircraft. Inadvertent movement of control handle 78 is prevented by means of a latch 80 which penetrates a slot in handle 78, the latch being formed with a detent for releasably engaging one edge of the slot.

Referring now to Figures 1, 2 and 6 for a description of the conduit system for liquid materials, it has already been stated that such materials are adapted to be discharged from the tank through discharge orifice fitting 60 which is coupled to one end of a conduit or pipe 62. The other end of pipe 62 is connected to the intake side of a pump 84 suspended from the underside of the fuselage 10 of the aircraft by a strut or brace 86. The rotor of the pump includes a shaft 88 which projects exteriorly of the casing of the pump and carries a small propeller or fan blade 90. The forward motion of the aircraft, during flight, rotates fan blade 90 which, in turn, drives the pump. If desired, the pump may be driven by a power take-off from the power plant of the aircraft in lieu of the arrangement just described. Preferably, the pump is equipped with a brake (not shown) controlled from the cockpit by means by which "windmilling" of the pump and unnecessary wear on pump elements may be prevented during those periods when the liquid conduit system is not in actual use. The discharge side of pump 84 is coupled to a conduit 92 which extends from the pump over to one side of hopper 16, along the entire length of the hopper, and then beneath the inclined rear wall 20 where it is threaded into one end of a T-joint 94. Another end of T-joint 94 communicates via pipe 96 with a pressure-control valve 98. As is well known, such valves may include an adjustable closure member (not shown), wherein the extent of relief is manually fixed by means of a handle 100 so as to vent from line 96 sufficient fluid to maintain in the line the pressure desired for spraying. In some cases, as where little variation in the liquid output of the spray system is necessary, a pump may be used that is equipped with a built-in pressure relief in lieu of the separate pump and relief valve. The excess fluid discharges from valve 98 through a line 102 which communicates by means of a T-joint 104 with a by-pass pipe 106 emptying back into hopper 16. The third end of T-joint 94 communicates through nipple 108 with the intake opening of a three-way valve, generally indicated at 110. As shown diagrammatically in Figures 6 and 6a, three-way valve 110 includes a movable inner member 112 which in one position (that of Figure 6) connects nipple 108 with line 114 and then to spray booms 116, and in the other position (that of Figure 6a) connects nipple 108 with line 118 which discharges into by-pass line 106 through T-joint 104. The spray boom employed in association with the apparatus of the present invention may be any of those which are already in use in this art and, accordingly, the boom has only been generally indicated.

When three-way valve 110 is in the position shown in Figure 6a, connecting pipe 92 with by-pass line 106, the fluid material is merely recycled from hopper 16 through the conduit system and back into hopper so that discharge of the fluid through the spray boom does not take place. On the other hand, when valve 110 is in the position of Figure 6, fully communicating between lines 92 and 114, the fluid material is discharged under pressure from the spray booms. The rate of discharge may be controlled directly by means of pressure relief valve 98, which determines the pressure in the lines; alternatively, the rate of flow may be governed by positioning the inner member 112 of three-way valve 110 at a position intermediate that at which lines 108 and 114 are fully connected or fully disconnected, in which case the excess back pressure set up by partial closure of the valve is vented through pressure relief valve 98.

A modified form of three-way control valve is illustrated in Figure 6b and this valve is of the type known as a "proportioning valve." The ports in the inner member of such a valve are so positioned relative to each other that line 114 is fully disconnected from line 108 only when line 118 is fully connected with line 108 and, conversely, line 118 is fully disconnected only when line 114 is fully connected, both being partially connected at all positions intermediate these two extremes. When using a proportioning valve, a pressure relief valve, such as 98, may be ordinarily dispensed with since the fluid which cannot pass through line 114 by reason of partial closure of the valve rotor is automatically fed into line 118 and thence back into hopper 16.

At the connection of by-pass line 106 with hopper 16, there is provided a normally closed, spring-loaded valve 119 which may be of the same type as valve 64. The valve prevents granular material from entering line 106 when solids are being dispensed, yet opens under pressure to permit liquids to be fed back into the hopper.

In order that the position of three-way control valve 110 may be conveniently adjusted by the operator of the aircraft, the valve includes an exterior lever arm 122, rotating with inner member 112, to which is pivoted one end of a connecting rod 124. The other end of rod 124 is pivoted to a crank 126 mounted on a rock shaft 128. Shaft 128 is adapted to be rocked by a control handle 130 extending upwardly therefrom into the cockpit of the aircraft within easy reach of the operator.

Preferably, the liquid conduit system is so designed to maintain a moderate amount of back-pressure on the pump at all times to prevent "racing" of the pump. This may be accomplished either by selecting the size of the by-pass line such that its capacity is less than that of the pump or by installing a fixed orifice (not shown) in the by-pass line to restrict the flow through the line to less than the capacity of the pump.

It has already been stated that the rate of discharge of granular material through chute-like conduit 32 is determined by means of a sliding plate valve 38 which is pivotally attached to one end of a connecting rod 40. In accordance with the present invention, the other end of rod 40 is connected to a crank arm 132 mounted on rock shaft 128 for rotation therewith and extending downwardly therefrom. It will thus be understood that the invention contemplates the use of a single control device for controlling the rate of flow of granular solids through the solid materials discharge system as well as that of liquid materials through the liquid materials discharge system. If desired, both connecting rods 40 and 124 may remain attached to their respective crank arms at all times; however, since only one of the rods is actually performing a useful function at any given time, it is preferred that only one of the rods be connected at one time, dependent upon whether granular solid or liquid material is being discharged, so that useless wear on the components may be eliminated. Therefore, it is recommended that the rods be adapted to be attached to their respective crank arms by means of a self-locking, quick-release pivot pin which may be of the type sold under the registered trademark "Pipe" by Aviation Developments, Inc., of Burbank, California.

The operation of the form of the apparatus just described proceeds generally as follows: hopper 16 is loaded with either granular solid or liquid material in accordance with the particular dispensing operation to which the aircraft and its operator have been assigned. Prior to loading, discharge valve control handle 78 has been manipulated to open either liquids discharge valve 64 or the solids valve 46 and close the other, dependent upon the particular material to be loaded. The fact that one of these valves is opened before dispensing is actually commenced is immaterial due to the presence in both the liquids and solids discharge systems of the rate-of-flow valves which are in fully closed position. In fact, this is advantageous since it also results inclosing the valve that does not correspond to the material being loaded which prevents the materials from entering the wrong conduit systems and avoids any possible adverse effects that this might have. After loading is completed but prior to take-off, the particular crank arm operated by the rate-of-flow control handle 130 is coupled to either of control rods 40 and 124 corresponding to the material to be dispensed. The aircraft is then ready to be flown to the particular area that is to be treated. Once this area has been reached and the operator is ready to begin dispensing, the rate-of-flow control handle 130 is manipulated to adjust the position of the particular rate-of-flow control valve to which it is connected.

In the form of the invention just described, the apparatus of the present invention, including the supply hopper, is disposed forward of the cockpit of the aircraft; since this arrangement may not be possible in all aircraft, there is shown in Figure 8 an arrangement wherein the relationship of the operator and the aircraft is reversed. The alternative arrangement contains all of the essential elements of the first arrangement in generally the same association, differing only as to the positions of these elements; accordingly, only a brief description will be supplied, using prime designations for components corresponding to those of the first form. Supply hopper 16' includes a solid materials discharge valve 46' and a liquid materials discharge valve 64' which are connected by rods 52' and 70', respectively, to control shaft 54'. The control shaft is rotated by a control handle 78' extending forwardly into the cockpit 12' of the aircraft. Fluids discharge outlet 60' communicates with the intake side of a pump 84' which feeds into a T-joint 94'. The T-joint is adapted to permit the fluid to flow both to pressure relief valve 98' and three-way valve 110'. The overflow fluid from relief valve 98' empties into by-pass line 106', and three-way valve 110' selectively discharges into by-pass line 106' and/or to the spray boom 116'. Positioning of three-way valve 110' is effected by a connecting link 124' which is attached to the rate-of-flow control handle 130'. Granular solid material discharges from hopper 16' through conduit 32' with the rate of flow being controlled by sliding plate valve 38' which is adapted to be connected and positioned to control handle 130'. The operation of the alternative arrangement is the same as that of the principal arrangement.

In some cases, it may be desired to dispense both liquid and solid materials without an interruption in the flight of the aircraft and, accordingly, there is suggested in Figure 9 a modified form of the apparatus of the present invention which permits both liquid and granular solid material to be successively dispensed. In accordance with this modification, the hopper 16", which includes inclined side walls 22" and 24" at the bottom thereof, is divided by a generally horizontally extending partition 150 into upper and lower compartments 151a and 151b, respectively. To permit passage of material from one compartment to the other, an opening 152 is provided in the partition which is adapted to be closed by a valve member 154 which may be hingedly connected thereto on one side of the opening. Movement of the valve is effected through a control link 156 which is connected to control shaft 54". Control shaft 54" is operated by a control handle 78" as before. Since the operator will normally have a free choice of whether to spray first or dust first, the same compartment may be used for the same material during each dispensing operation with the operation of valve 152 so synchronized with the operation of the remaining valves as to open during the changeover from one material to the other. In the operation of the modified form of the invention, the lower compartment is filled with the material to be first dispensed and the upper compartment filled with the other material, with one of the discharge valves at the lower end of the tank being opened and the other discharge valve and the partition valve being closed. After the supply of material in the lower compartment has been exhausted, the control shaft is rotated in the manner already described, closing the discharge valve that was initially open and opening the other discharge valve together with the partition valve. This permits the material in the upper compartment to flow down into the lower compartment from whence it may be discharged through the corresponding discharge valve and dispensed in the usual fashion.

As a safety precaution, the authorities in most countries who regulate aircraft dusting and spraying require that there be some means whereby the liquid being sprayed can be "dumped," that is, quickly ejected from the aircraft, in the event of an emergency. It will be appreciated that the closure plate and slide valve are well adapted to be used for this purpose. Thus, should a situation suddenly arise while liquid is being sprayed that requires that the plane be lightened or the like to avoid an accident, the operator need only open the closure plate and slide valve all the way to empty the hopper almost instantaneously.

In cases where the pump is driven from the power plant of the aircraft, it is well to insert a safety relief valve (not shown) in the supply line which valve is set to spill at a line pressure which is less than that which might cause damage to the gear train driving the pump or to the conduit system.

Where the term "granular" has been used in this description, it is to be construed as including all of the various states of subdivision of solid material that can be accommodated by the apparatus, irrespective of whether such states can be more strictly described as powdered, pelleted, fragmentary or the like.

It will be appreciated that the forms of the apparatus described are subject to variation and further modification as to both design and components. Consequently, the invention is not to be limited to the particular details of the described apparatus but only by the scope of the claims hereunto appended.

Having thus described the invention, that which is claimed is:

1. Combined spraying and dusting apparatus adapted to be mounted on and carried by an aircraft comprising a storage bin adapted for selectively containing both liquid and granular material, said bin having inclined sidewalls adjacent the lower end thereof and a large discharge opening at said lower end thereof adapted for the passage therethrough of granular material, a closure plate for said opening movable to and from fully opened and fully closed positions, said bin also having a smaller discharge opening adjacent said lower end thereof adapted for the passage therethrough of liquid material, a valve for said smaller opening movable to and from fully opened and fully closed positions, a single control device connected to both said closure plate and said valve and adapted to simultaneously open one and close the other and vice versa, and two separate means communicating with said discharge openings for distributing the respective materials passing therethrough.

2. The apparatus as in claim 1 including at least one pair of crossed links pivotally connected to said closure plate, which pair of links is in turn, pivotally connected to a sidewall of the bin whereby when said plate is in open position it is disposed entirely above its closed position and at generally right angles thereto.

3. The apparatus as in claim 1 wherein said single control device includes a rotatably mounted control shaft, at least one articulated link fixed at one end to the shaft and pivoted at the other end to said plate, and a rod pivoted at one end to said shaft on a radius different from that of the fixed end of said link, and at the other end to the valve, and means for rotating said shaft, whereby rotation of said shaft in one direction seats said plate and unseats said valve and in the other direction unseats said plate and seats said valve.

4. The apparatus as in claim 3 wherein said articulated link includes a telescoping section and spring means urging said section to extended position whereby said plate in closed position is spring-loaded against the discharge opening.

5. The apparatus as in claim 1 wherein said independent distributing means includes spraying means for said liquid material, liquid conduit means between said smaller discharge opening and said spraying means, a control valve interposed in said conduit means, spreading means for said granular material, conduit means between said larger discharge opening and said spreading means, a control valve interposed in said last-mentioned conduit means, and a single operating means for both of said control valves which is adapted to be selectively connected thereto.

6. The apparatus as in claim 5 wherein the liquid conduit means includes a pressure regulating valve upstream from said control valve which regulating valve is vented into said bin.

7. The apparatus as in claim 5 wherein said control in the liquid conduit means valve is adapted to place said discharge opening selectively in communication with said spraying means and with said bin.

8. Apparatus adapted to be mounted on and carried by an aircratf for successively dispensing granular and liquid materials without an interruption in flight comprising a storage bin having inclined sidewalls at least adjacent the lower end thereof, a partition in said bin dividing the same into upper and lower compartments, each of which is adapted to contain a supply of one of said materials, said partition having an opening therein, a closure member for said opening, said sidewalls at the lower end of said bin having two openings therein for individually discharging liquid and solid materials, closure members independent of each other for said last-mentioned openings, and a common movable control member connected to all of said closure members which control member is adapted upon movement in one direction to cause said partition closure member and one of said independent closure members to shift from closed to open position and the other of said independent closure member to shift from open to closed position whereby during flight one of said independent members is maintained in open position with the other independent member and the partition closure member closed until the material in the lower compartment is discharged and thereafter the said opened independent member is closed and the said closed independent member and said closed partition member opened to permit the material in the upper compartment to pass into the lower compartment and be discharged.

9. Apparatus for dispensing liquid and granular material alternatively from the same aircraft, which apparatus comprises a single hopper for receiving both materials but containing only one of them at a time, said hopper having two separate and distinct openings therein, one for each of said materials, through which the materials leave said hopper, separate valve means for each of said hopper openings, only one of said valves being open at a time, two separate distributing means for the respective materials, and two separate conduits connecting the openings to the distributing means each of said valve means when closed, maintaining the corresponding conduit and distributing means out of communication with said hopper and free of material contained by said hopper.

10. Apparatus for dispensing liquid and granular material alternatively from the same aircraft, which apparatus comprises a single hopper for receiving both materials but containing only one of them at a time, said hopper having two separate and distinct openings therein, one for each of said materials, through which the materials leave said hopper, two distributing means separate from one another for the respective materials, two conduits separate from one another connecting the openings to the distributing means, two rate-of-flow control means, one in each of the respective conduits, and a single operating means common to both of said control means.

11. Apparatus for dispensing liquid and granular material alternatively from the same aircraft, which apparatus comprises a single hopper for receiving both materials but containing only one of them at a time, said hopper having two separate and distinct openings therein, one for each of said materials, through which the respective materials leave said hopper, two means separate from one another for discharging the respective materials from said hopper, one of said means connecting with one of said openings and the other of said means with the other of said openings, and separate valve means associated with each discharging means for placing the discharging means in communication one at a time with the corresponding openings and for controlling the rate of discharge of the material through the said means.

12. Apparatus for dispensing liquid and granular materal alternatively from the same aircraft, which apparatus comprises a single hopper for receiving both materials but containing only one of them at a time, said hopper having an elongated aperture in the bottom thereof extending at least a substantial portion of the hopper width, said elongated aperture being adapted to pass said granular material out of said hopper, a plate valve adapted to fit said aperture and close off the same, said hopper having a port therein adjacent the bottom but separate from said aperture, said port being adapted to pass fluid material from said hopper, a disc valve associated with said port for closing off the same at the hopper, only one of said plate and disc valves being open at the same time, and two means separate from one another for discharging the respective materials, one of said means being connected to said aperture and the other to said port to receive the material passed therethrough and discharge the same.

13. Dispensing apparatus as in claim 12 wherein the discharging means in communication with said elongated aperture is a spreader for granular material having a casing open at front and rear to permit air flow therethrough and being generally of Venturi shape, and the discharging means in communication with said port is a hollow boom having spray openings therein, said boom being connected to said port through a conduit.

14. Dispensing apparatus as in claim 13 wherein said hopper includes side walls inclined toward each other to define at the bottom thereof a throat which constitutes said elongated aperture through which said granular material is adapted to pass, and one of said side walls is provided adjacent said throat with a generally circular opening which constitutes said port, said disc valve being adapted to seat in said opening to close the same.

15. Dispensing apparatus as in claim 14 wherein said disc valve is normally spring-biased to closed portion and means are provided for maintaining said valve open against the force of said spring.

16. In a dispensing apparatus including a hopper having two ports adjacent the bottom thereof, the fluid dispensing sub-combination comprising an outflow conduit connected at one end to one of said ports, a stem valve adapted to seat in the port connected to said outflow conduit to close off the port, the stem of said valve extending within said conduit, spring means within said conduit for biasing said valve to closed position, means exterior of said outflow conduit for maintaining said valve open against said spring, a pump connected on the intake side to the other end of said outflow conduit, means for driving the pump, an intermediate conduit connected at one end to the outlet side of said pump, a T-joint connected to the other end of said intermediate conduit, a return conduit connected at one end to one side of said T-joint and at the other to the other port in said hopper, a pressure regulator in said return conduit, a stem valve adapted to seat in said other port to close off the same, said valve having the stem thereof extending within said return conduit and being spring-biased to closed position, a discharge conduit connected at one end to the other side of said T-joint, and a spray boom connected to the other end of said spray boom.

References Cited in the file of this patent

UNITED STATES PATENTS

| | | | |
|---|---|---|---|
| 415,587 | Strawson | | Nov. 19, 1889 |
| 808,236 | Hahn | | Dec. 26, 1905 |
| 894,813 | Buxxell et al. | | Aug. 4, 1908 |
| 1,009,428 | MacKaye | | Nov. 21, 1911 |
| 1,604,290 | King | | Oct. 26, 1926 |

FOREIGN PATENTS

| | | |
|---|---|---|
| 609,516 | Great Britain | Oct. 1, 1948 |